United States Patent
Khanna

(10) Patent No.: US 12,525,353 B1
(45) Date of Patent: *Jan. 13, 2026

(54) OPHTHALMIC APPARATUS AND SYSTEMS FOR TELE-OPHTHALMOLOGY AND COLLABORATIVE CARE

(71) Applicant: Sandeep Khanna, Calabasas, CA (US)

(72) Inventor: Sandeep Khanna, Calabasas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/098,301

(22) Filed: Apr. 2, 2025

Related U.S. Application Data

(63) Continuation-in-part of application No. 17/360,785, filed on Jun. 28, 2021, now Pat. No. 12,268,448.

(Continued)

(51) Int. Cl.
*G16H 40/67* (2018.01)
*G02B 21/00* (2006.01)

(Continued)

(52) U.S. Cl.
CPC ......... *G16H 40/67* (2018.01); *G02B 21/0012* (2013.01); *G02B 21/361* (2013.01); *H04L 65/1089* (2013.01); *H04L 65/1108* (2022.05); *H04N 23/661* (2023.01); *A61B 3/132* (2013.01); *A61B 3/135* (2013.01)

(58) Field of Classification Search
CPC ....... A61B 3/0083; A61B 3/107; A61B 3/132; A61B 3/135; A61B 1/0638; A61B 5/0022; G01N 23/2251; G02B 21/0012; G02B 21/244; G02B 21/361; G02B 21/368; G02B 26/085; G03G 9/113; G06F 3/013; G06T 7/60; G06T 7/97; G06V 10/145; G06V 10/25; G16H 40/67; G16H 50/20; G16H 10/20; G16H 10/40; G16H 20/30; G16H 30/20; G16H 70/20; G16H 80/00; H01F 39/026; H04L 65/1089; H04L 65/1108; H04N 7/183; H04N 7/185; H04N 23/661; H04N 21/42204; H04N 23/62; G01K 1/20; G06N 3/044; H04W 12/03

See application file for complete search history.

(56) References Cited

U.S. PATENT DOCUMENTS

| | | | | |
|---|---|---|---|---|
| 5,216,596 A | * | 6/1993 | Weinstein | H04N 7/183 382/128 |
| 6,361,167 B1 | * | 3/2002 | Su | A61B 3/107 351/206 |

(Continued)

*Primary Examiner* — Gerald Gauthier
(74) *Attorney, Agent, or Firm* — Plager Schack LLP; Mark H. Plager; Alexis Saenz

(57) ABSTRACT

The proposed technology includes pathology apparatuses and systems that allow transmission of pathological content over the web in "real-time" alongside face-to-face audio-visual communication between the various parties. The digital output of the camera will be in a format that is compatible with direct transmission over the web. This allows a person(s) at the remote site to see the microscopic imagery as if the remote examiner(s) were on site in the presence of the pathology specimen and simultaneously video-chat with the operator of the microscope to provide tele-consultation. The features also facilitate collaboration between several parties, by enhancing the audio-visual communication between parties with the actual microscopic imagery in real time.

10 Claims, 20 Drawing Sheets

Related U.S. Application Data

(60) Provisional application No. 63/044,502, filed on Jun. 26, 2020.

(51) Int. Cl.
*G02B 21/36* (2006.01)
*H04L 65/1089* (2022.01)
*H04L 65/1108* (2022.01)
*H04N 23/661* (2023.01)
*A61B 3/13* (2006.01)
*A61B 3/135* (2006.01)

(56) References Cited

U.S. PATENT DOCUMENTS

| | | | |
|---|---|---|---|
| 10,223,591 B1* | 3/2019 | Goldenberg | H04N 23/661 |
| 10,510,143 B1* | 12/2019 | Zhou | G06T 7/60 |
| 11,589,003 B2* | 2/2023 | Schoenberg | H04N 21/42204 |
| 11,728,030 B2* | 8/2023 | Whitehurst | G16H 40/67 |
| | | | 705/3 |
| 11,862,302 B2* | 1/2024 | Pinter | G06N 3/044 |
| 12,268,448 B1* | 4/2025 | Khanna | G16H 40/67 |
| 12,352,976 B1* | 7/2025 | Oskui | G06F 3/013 |
| 2003/0117580 A1* | 6/2003 | Franz | G16H 50/20 |
| | | | 351/205 |
| 2004/0240050 A1* | 12/2004 | Ogihara | G02B 21/244 |
| | | | 359/392 |
| 2005/0018134 A1* | 1/2005 | Noda | A61B 3/132 |
| | | | 351/205 |
| 2005/0024587 A1* | 2/2005 | Somani | A61B 3/135 |
| | | | 351/214 |
| 2005/0254009 A1* | 11/2005 | Baker | A61B 3/0083 |
| | | | 351/245 |
| 2007/0120979 A1* | 5/2007 | Zhang | H04N 7/185 |
| | | | 348/154 |
| 2010/0208054 A1* | 8/2010 | Farr | A61B 1/0638 |
| | | | 345/158 |
| 2012/0010904 A1* | 1/2012 | Buck | G16H 80/00 |
| | | | 705/3 |
| 2014/0018779 A1* | 1/2014 | Worrell | G16H 40/67 |
| | | | 606/1 |
| 2014/0095196 A1* | 4/2014 | Waterson | G16H 10/40 |
| | | | 705/2 |
| 2014/0278475 A1* | 9/2014 | Tran | G16H 20/30 |
| | | | 705/2 |
| 2014/0307052 A1* | 10/2014 | Ahn | G01N 23/2251 |
| | | | 348/46 |
| 2015/0077536 A1* | 3/2015 | Messier | G06V 10/145 |
| | | | 348/80 |
| 2015/0261996 A1* | 9/2015 | Kim | H04N 23/62 |
| | | | 348/14.03 |
| 2016/0026768 A1* | 1/2016 | Singh | G01K 1/20 |
| | | | 705/3 |
| 2016/0302666 A1* | 10/2016 | Shaya | G16H 10/20 |
| 2017/0038562 A1* | 2/2017 | Georgiev | H10F 39/026 |
| 2017/0076043 A1* | 3/2017 | Dormer | G16H 40/67 |
| 2017/0116384 A1* | 4/2017 | Ghani | G16H 70/20 |
| 2018/0052405 A1* | 2/2018 | Ishikawa | G03G 9/113 |
| 2018/0055356 A1* | 3/2018 | Shibata | G02B 21/368 |
| 2018/0356344 A1* | 12/2018 | Yi | G02B 26/085 |
| 2019/0069778 A1* | 3/2019 | Pourhoseini | A61B 5/0022 |
| 2019/0189292 A1* | 6/2019 | Shaya | G16H 30/20 |
| 2020/0203024 A1* | 6/2020 | Hunter | G16H 40/67 |
| 2020/0221951 A1* | 7/2020 | Amble | G16H 50/20 |
| 2020/0372643 A1* | 11/2020 | Esposito | G06T 7/97 |
| 2021/0330189 A1* | 10/2021 | Rose | H04W 12/03 |

\* cited by examiner

OPHTHALMIC APPARATUS AND SYSTEMS FOR TELE-OPHTHALMOLOGY AND COLLABORATIVE CARE

CROSS-REFERENCE TO RELATED APPLICATION

This application claims priority to provisional patent application U.S. Non-Provisional application Ser. No. 17/360,785, filed Jun. 28, 2021, which claimed priority from U.S. Provisional Ser. No. 63/044,502 filed on Jun. 26, 2020, the entire contents of which, including drawings and a specification are herein incorporated by reference.

BACKGROUND

The embodiments herein relate generally to ophthalmic systems and in particular, to an ophthalmic apparatus and system for tele-ophthalmology and collaborative care.

Tele-ophthalmology, in its current form, is either a face-to-face video consultation between a patient and the consulting eye care provider using a web-based software in Protected Health Information (PHI) format, or involves some form of an asynchronous store-and-forward (SAF) telecommunications technique to facilitate communication between two providers (SAF provider-to-provider tele-consults) using the acquired images or recorded videos from various ophthalmic devices like slit lamp microscope.

Aforementioned uses of Tele-ophthalmology have rarely addressed "real-time" remote slit-lamp examination by an eyecare provider (RT provider-to-provider tele-consults). The use of digital slit lamps in tele-ophthalmology have invariably involved SAF—technique using stored images or recorded videos using a tele-communication technique in an asynchronous fashion, but rarely with direct feed from the slit-lamp being transmitted to a consulting provider in real-time and in a Protected Health Information (PHI) format (like with HIPAA-compliance). In the rare instances, in which the ophthalmic systems were devised to allow remote diagnosis with real-time slit-lamp data, it was unaccompanied by concomitant audio-visual communication between the participants or were in a format that were not specified to protect patient health information. In addition, the digital output of the camera will be in a format that is compatible with direct transmission over the web without any data conversion or data storage.

Digital pathology involves the acquisition, management, and distribution of pathology and clinical laboratory digital images and their associated data. Gross and microscopic static images (for example, those captured by a device or system such as the microscope 110 and/or a digital camera 150 disclosed above) and live view telepathology are part of digital pathology, but the term may be primarily associated with the creation of virtual glass slides, so-called whole slide images (WSI); a type of asynchronous/store-and-forward paradigm of telemedicine. Among other benefits, WSI of the subject technology reduces the risk of mixing up patient slides, eliminates the burden of storage of physical glass slides, enables pathologists to process cases remotely, and the use of artificial intelligence (A.I.) to digitized images for assisted diagnosis. Despite the potential advantages of WSI, there are notable barriers to implementing digital pathology limited to WSI, including obtaining repeatably consistent image quality, dealing with the large number of image files associated with every slide, expensive hardware costs and workflow adjustments.

Live view telepathology was first described by Ronald Weinstein (U.S. Pat. No. 5,216,596 (Issued on Jun. 1, 1993) for application Ser. No. 462,991 (filed Jan. 5, 1990) and U.S. Pat. No. 5,297,034A (Priority to U.S. Ser. No. 08/000,497) Granted Mar. 22, 1994. Both now Expired). This paradigm facilitated Remote viewing of glass slides by qualified Pathology subspecialists wherein the digital microscopes were located at Pathology Labs or Hospitals who lacked such expertise. Live view Telepathology also enabled Pathologists to obtain second opinion or secondary diagnosis from other experts. In addition, this paradigm allowed for enhanced learning experience for doctors-in-Training in Teaching Hospitals.

The currently available software solutions to enable live telepathology consultations have used two paradigms:

The first offers live tele-consultations primarily as a server-based solution. In its standard deployment, their systems run on a dedicated computer or local server that manages streaming of microscope images to remote users. This was done as available web-based tele-conferencing solutions were unsuitable for remote secondary diagnosis due to poor resolution, security issues, and cumbersome user interfaces. SpotMeeting (originally PathCast) [Diagnostic Instruments Inc., Sterling Heights, MI], Augmentiqs [Augmentiqs Medical Ltd, Israel] and Motic FS-Live Telepathology System [Motic Digital Pathology, Emeryville, CA] have used this set-up to overcome these limitations. Motic FS-Live Telepathology System also uses remote access software to robotically control the digital microscopes in conjunction with live streaming.

The second configuration enables live teleconsultations by a remote expert viewer by using available remote access software (RAS). Using the RAS, the remote expert viewer accesses the PC that is connected to a digital microscope to view the mounted glass slides as well as robotically control the digital microscope. Accu-Scope is a clinical microscope company that offers such remote access system called the "RC500" which allows users to remotely view slides and robotically control the microscope through dedicated software, enabling collaborative viewing and manipulation of specimens from a distance.

The problem with these set-ups is that to prevent outside incursion of Protected Health Information (PHI) the set-up is limited to be used within a confined network. The users within the Network can log-on to the Network and view the slides remotely either via server-installed application or by using an RAS. The users outside the Network are compelled to use dedicated VPN connections to the Network or the Server housing the software. This requires elaborate and expensive set-ups by the IT personnel as well as dedicated team to manage this configuration. This set-up also prevents remote viewing if the viewing expert is unable to connect to the Network or the Server. The current set-ups are limited to a single Client-to-Client communication.

Current networks that are used for telepathology use a traditional server based configuration where a host intermediary (for example, a server) connects remote parties to a local device. Data captured by the local device is forwarded to the host server where it is processed and retransmitted to remote devices that are granted access to files. Generally speaking, the images captured in these conventional networked set-ups are stored as static files, which can be impractical when trying to work with a sample specimen in real-time. Some networks attempt to transmit live imaging but as is commonly seen even outside the medical field, the images captured in real-time suffer in quality due to bandwidth constraints and reformatting issues that occur when the live imaging is first processed through the server for re-transmission and reproduced on the client device end. For medical practitioners, traditional networks do not sufficiently present a clear enough image when trying to provide a diagnosis on features present in specimen samples.

SUMMARY

In one aspect of the subject technology, a system for a tele-pathological collaborative online session is disclosed. The system includes a microscope configured to capture an image of a specimen. A digital camera is coupled to the microscope and positioned to capture imagery of a specimen sample within the field of view of the microscope. A video adapter is coupled to the microscope to focus a light output from the microscope to the attached digital camera. A communications cable is connected between the digital camera and a first computing device, to forward the captured imagery to the first computing device. A network connection is configured to transmit the captured imagery from the first computing device to a remote computing device(s) connected to the first computing device, using a web-based real-time communication protocol. The transmitted captured imagery is seen in real-time as if remote user(s) at the remote computing device(s) were seeing the image of the specimen sample on-site in the presence of the specimen sample.

In another aspect, a method of performing a tele-pathological collaborative online session is disclosed. The method includes capturing light reflected off a specimen sample within the field of view of a microscope, wherein the microscope is coupled to a video adapter configured to focus a light output from the microscope. The reflected light is captured with a digital camera. The reflected light captured by the digital camera is converted into a digital format of data. The digitally formatted data is transmitted through a network using a web-based real-time communication protocol to a remote computing device located in a second location. An image of the specimen sample is displayed in real-time video on the remote computing device. The image is displayed alongside a face-to-face audio-visual communication.

In still yet another aspect, a computer program product for performing a tele-pathological collaborative online session is disclosed. The computer program product comprises a non-transitory computer readable storage medium having computer readable program code embodied therewith. The computer readable program code is configured to, when executed by a processor, to capture light reflected off a specimen sample within the field of view of a microscope, wherein the microscope is coupled to a video adapter configured to focus a light output from the microscope. The reflected light is captured with a digital camera. The reflected light captured by the digital camera is converted into a digital format of data. The digitally formatted data is transmitted through a network using a web-based real-time communication protocol to a remote computing device located in a second location. An image of the specimen sample is displayed in real-time video on the remote computing device. The image is displayed alongside a face-to-face audio-visual communication.

BRIEF DESCRIPTION OF THE FIGURES

The detailed description of some embodiments of the invention is made below with reference to the accompanying figures.

DETAILED DESCRIPTION OF CERTAIN EMBODIMENTS

In general, and referring to the Figures, embodiments of the disclosed subject technology provide an ophthalmological test whose result may be viewed simultaneously by various participants, some of which may be remotely located from the ophthalmological test device's location. In an exemplary embodiment, a digital slit-lamp may be interfaced with several web-based software platforms (for example, WebRTC) to allow an observer to view the slit-lamp examination imagery being conducted at a remote location in "real time" seamlessly and alongside "face-to-face" video chat. The image data from a slit-lamp is transmitted in a format that streams the data in real-time as if the remote user/viewer were seeing the slit-lamp imagery on site in the presence of the patient.

Furthermore, embodiments will facilitate collaborative care between several providers, as well as patient representative(s), by enhancing the video chat between parties with the actual slit lamp imagery of the patient in real time.

Figure 1:
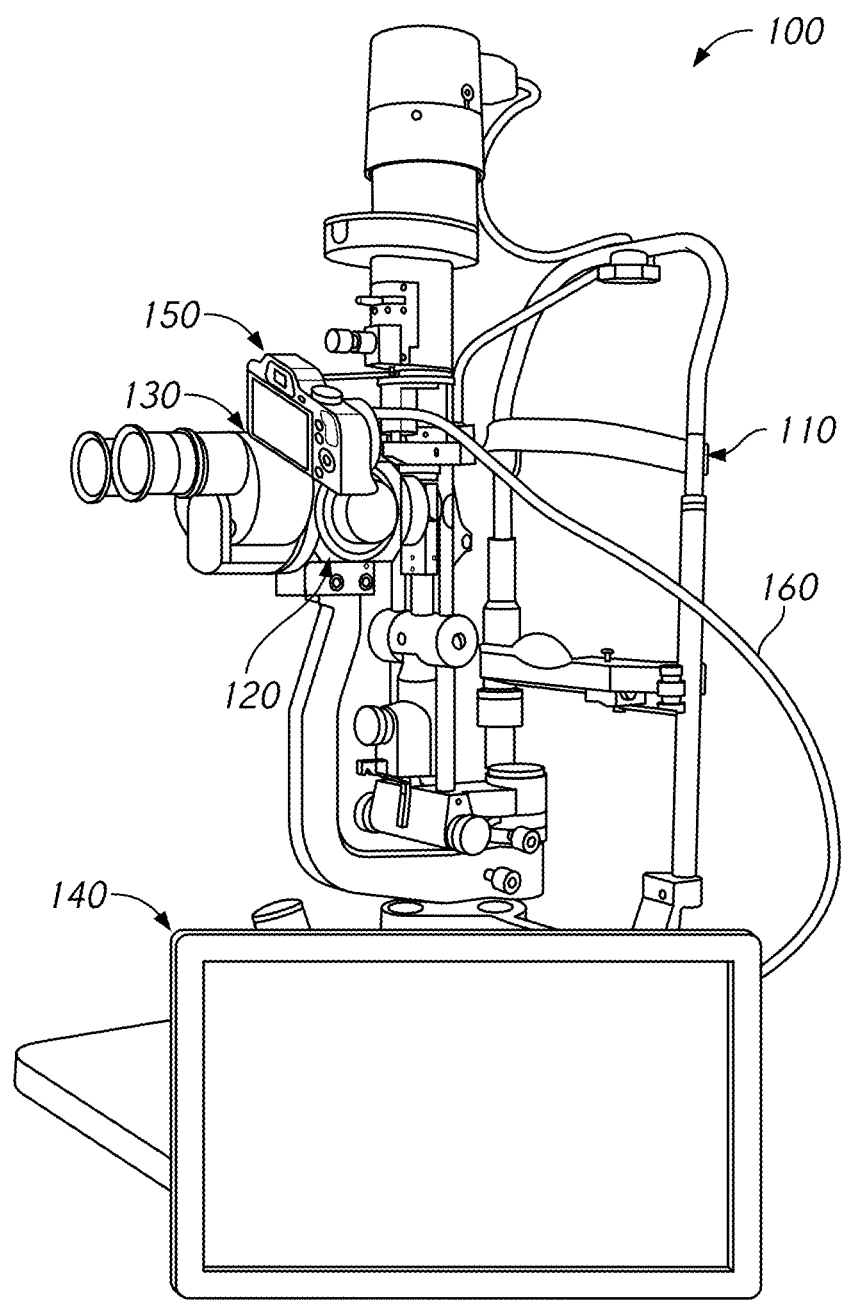
FIG. 1 is a perspective view of an operator side of an ophthalmic system for tele-ophthalmology and collaborative care in accordance with embodiments of the subject technology.

Referring now to FIG. 1, a system 100 may include a slit lamp microscope 110, which as will be appreciated, is a key tool in determining the health of the eyes and detecting eye disease. The system 100 may further include a digital camera 150 connected to the slit lamp 110 to allow image capture or video recording of the eye during an examination. To permit tele-consults using the data captured, the current paradigm may use an asynchronous store-and-forward (SAF) technique to allow tele-consults.

The ophthalmic apparatus and systems allow digital output from the slit lamp 110 (both of the visible light as well as of the infra-red wavelength) to be transmitted over the web in "real-time" alongside face-to-face audio-visual communication between the various parties. This allows:

1) person(s) at the remote site to see the slit-lamp imagery as if the remote examiner(s)/viewers was/were on site in the presence of the patient and simultaneously allow video-chat with the operator of the microscope to provide teleconsultation, and
2) facilitate collaborative care between several providers, as well as patient representative(s), by enhancing the audio-visual communication between parties with the actual slit lamp imagery of the patient shown in real time.

The system 100 may generally be configured in a network embodiment that includes an operator side and a remote examiner side. The operator side of the system is shown according to an exemplary embodiment in FIG. 1. The operator-side of the network comprises the slit lamp 110, a beam-splitter 120, a video-adapter 130, a first computing device 140 for the operator of the slit lamp microscope 110, a digital camera 150 (that may include a feature to toggle to allow capture of both the color as well as infra-red imagery), and a communication cord 160, (which may be for example, a USB format cable). In some embodiments, software for the operator of the microscope and a media server 8 (FIG. 2) connected to the system 100 via a telecommunications connection may be included.

Figure 2:
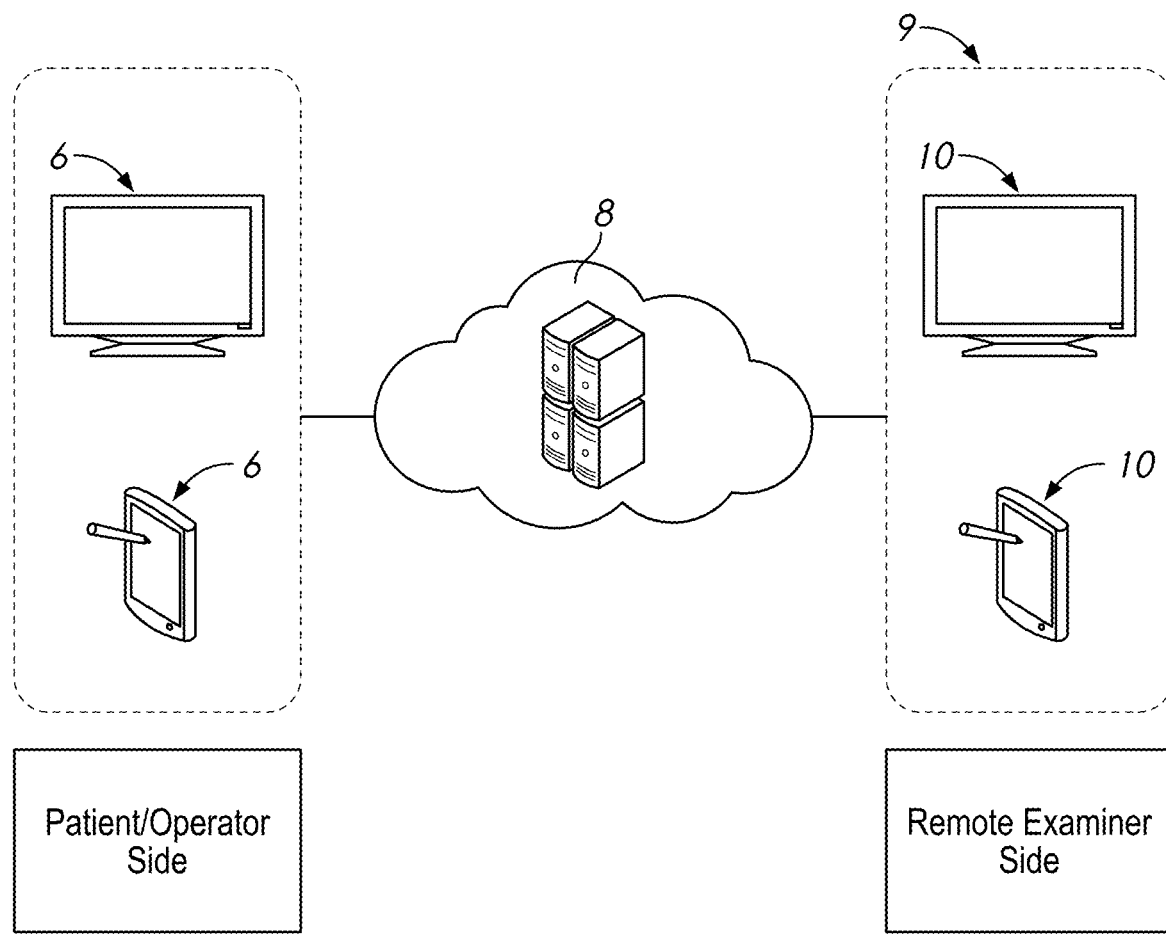
FIG. 2 is a block diagram an ophthalmic system for tele-ophthalmology and collaborative care showing both the operator side and remote examiner(s) side connected through a network in accordance with embodiments of the subject technology.

For example, and referring to FIG. 2, a network embodiment is shown connecting the patient/operator side to a remote examiner side via media server 8 through a telecommunications network. On the remote examiner side of the network, the system includes one or more computing device(s) 9, which may be for use by the remote examiner(s). The computing device(s) 9 may include a copy of the software 10 (which may be the same as software 6 or a tailored version of software just for remote examiner(s)) which may be configured with an interface and features for the remote examiner(s).

In an exemplary embodiment, the slit lamp 110 may be modified to allow insertion of the beam splitter 120 with an integrated video adapter 130 attached. This allows the video-adapter 130 to focus the light output from the slit lamp 110 to the attached digital camera 150. The digital camera 150 will both receive the power as well as transmit imagery through an attached cable 160 to the computing device 140.

Figure 3:
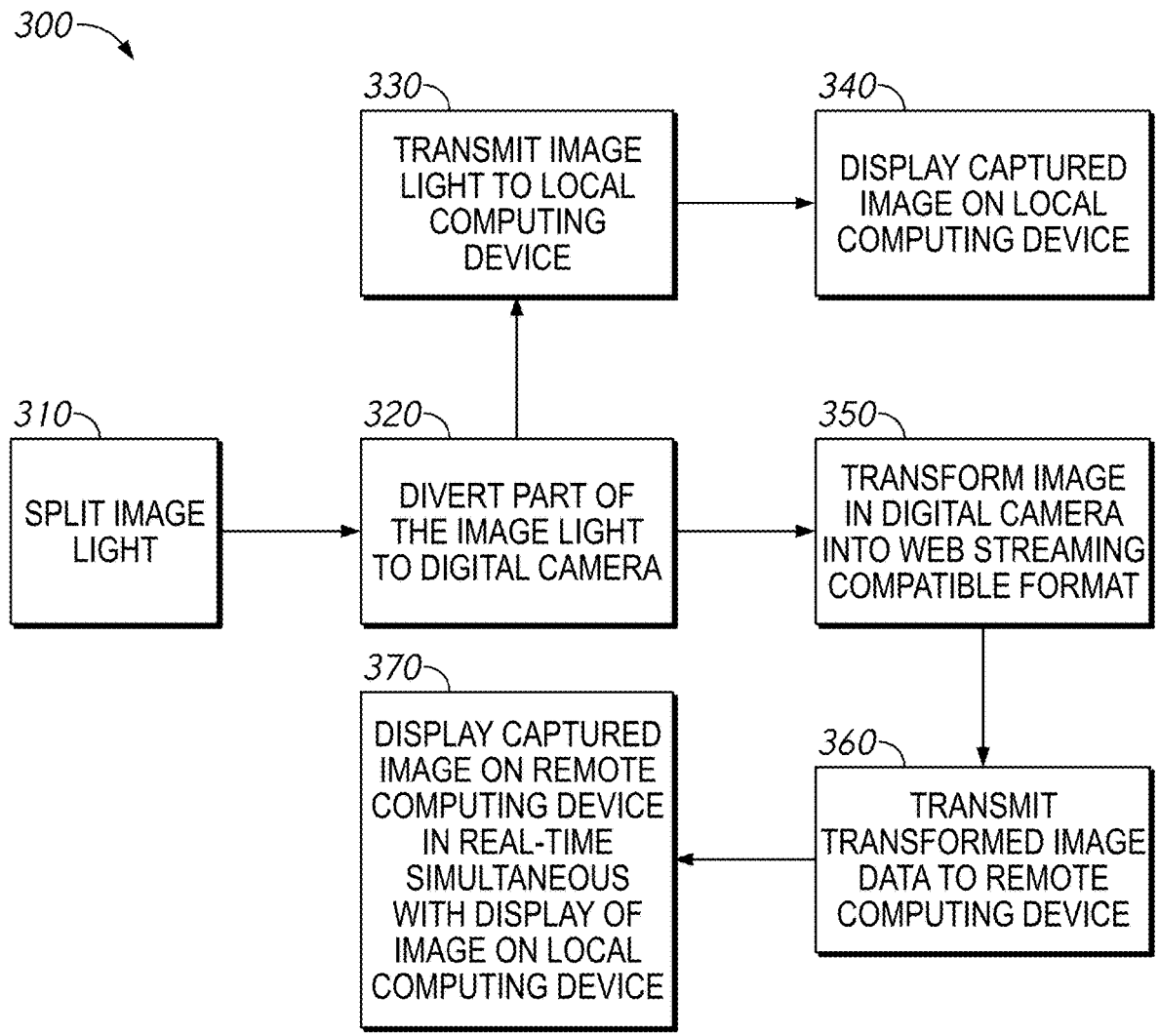
FIG. 3 is a flowchart of a method of generating simultaneous tele-ophthalmological imaging to remote locations in accordance with embodiments of the subject technology.

Referring now to FIG. 3, a method 300 of generating simultaneous tele-ophthalmological imaging to remote locations is shown according to an exemplary embodiment. The image light may be split 310 as the image is captured in the system. The captured light from the slit lamp may be partially diverted 320 through the beam splitter.

Some of the diverted image light may be sent 330 to the local computing device (thus, still allowing simultaneous actual examination by the local user/operator). The captured image may be displayed 340 on the local computing device.

The other diverted portion of the image may be directed to the video adapter to focus the image onto the digital camera. At the digital camera, the image may be transformed 350 into a web streaming compatible format. The communication cable supplies the electrical power to the digital camera, sends commands to control the digital camera, and transmits 360 the imagery to the remote computing device on the examiner side of the system. The captured image may be displayed 370 simultaneously in real-time between the local computing device and the remote computing device(s). While a single remote computing device has been generally described, it will be understood that multiple remote computing devices may receive the transmitted image.

The computing device for the operator of the microscope (slit lamp) may store software that will a) send commands to the digital camera to either be in a color or infra-red mode, b) allow capture of still or video images, and c) allow "real-time" transmission of the slit-lamp digital output over the network connection alongside face-to-face video chat to allow a remote examiner(s) to see the slit-lamp imagery as if the remote examiner was on site in the presence of the patient or facilitate collaborative patient care.

Figure 4:
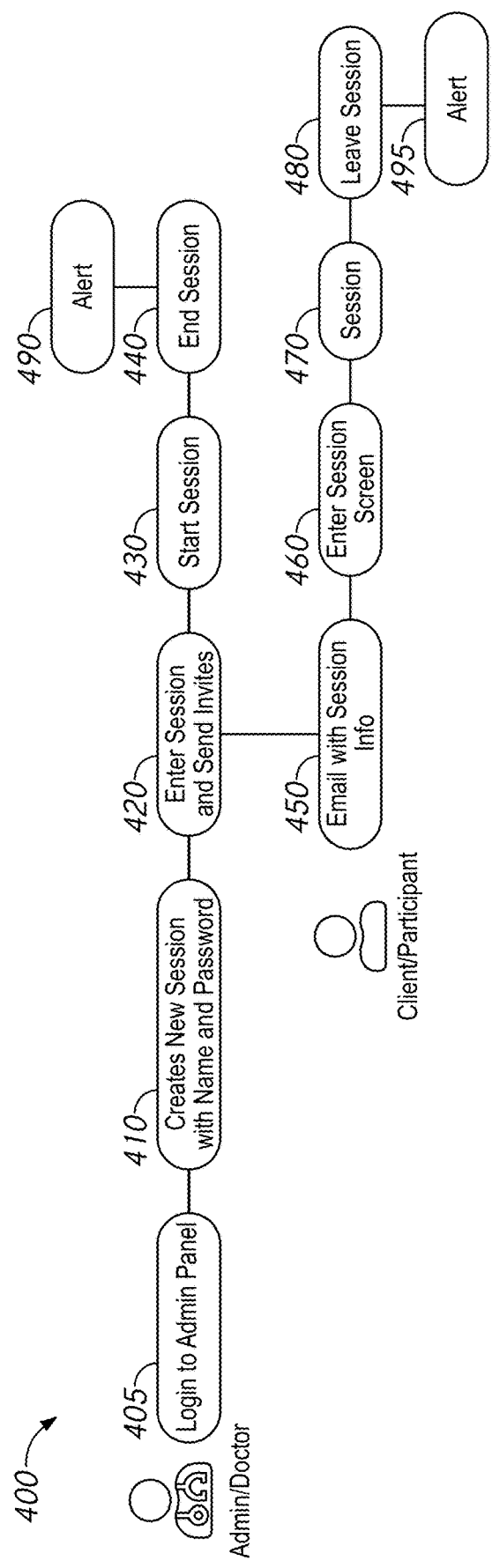
FIG. 4 is a block diagram of a process for an interactive ophthalmological online video session for remote participants in accordance with embodiments of the subject technology.

FIG. 4 shows a process 400 for an interactive ophthalmological online video session for remote participants according to an exemplary embodiment. When an administrator or physician logs in 405 to an administrative panel, a new session may be initiated 410. In an exemplary application, a physician may wish to remotely examine a patient and may wish to include multiple parties aside from the patient to the examination (for example, when desiring to show evidence to an insurance representative, seeking a second opinion from a colleague, or showing a family member the condition of the patient). The user physician may enter the session and send 420 invitations to parties (including for example, the local technician or physician's assistant and other interested third parties). In some embodiments, invitations may be sent 450 by email (or some other electronic means including for example, a notification system installed in the software application running the video session). The physician user may start 430 the video session. Third parties and the local ophthalmological device technician/operator will enter 460 the video session. The session will display 470 the captured ophthalmological imagery to the local operator and to all remote participants. The participants may engage in discussion of the examination and sharing of documents as needed. The physician/administrator user may terminate 440 the session at will and the remaining parties may leave 480 the session as needed or until it is terminated. In some embodiments, the physician user may receive an alert 490 and the invited participants may receive an alert 495 indicating the session is over.

Figure 5:
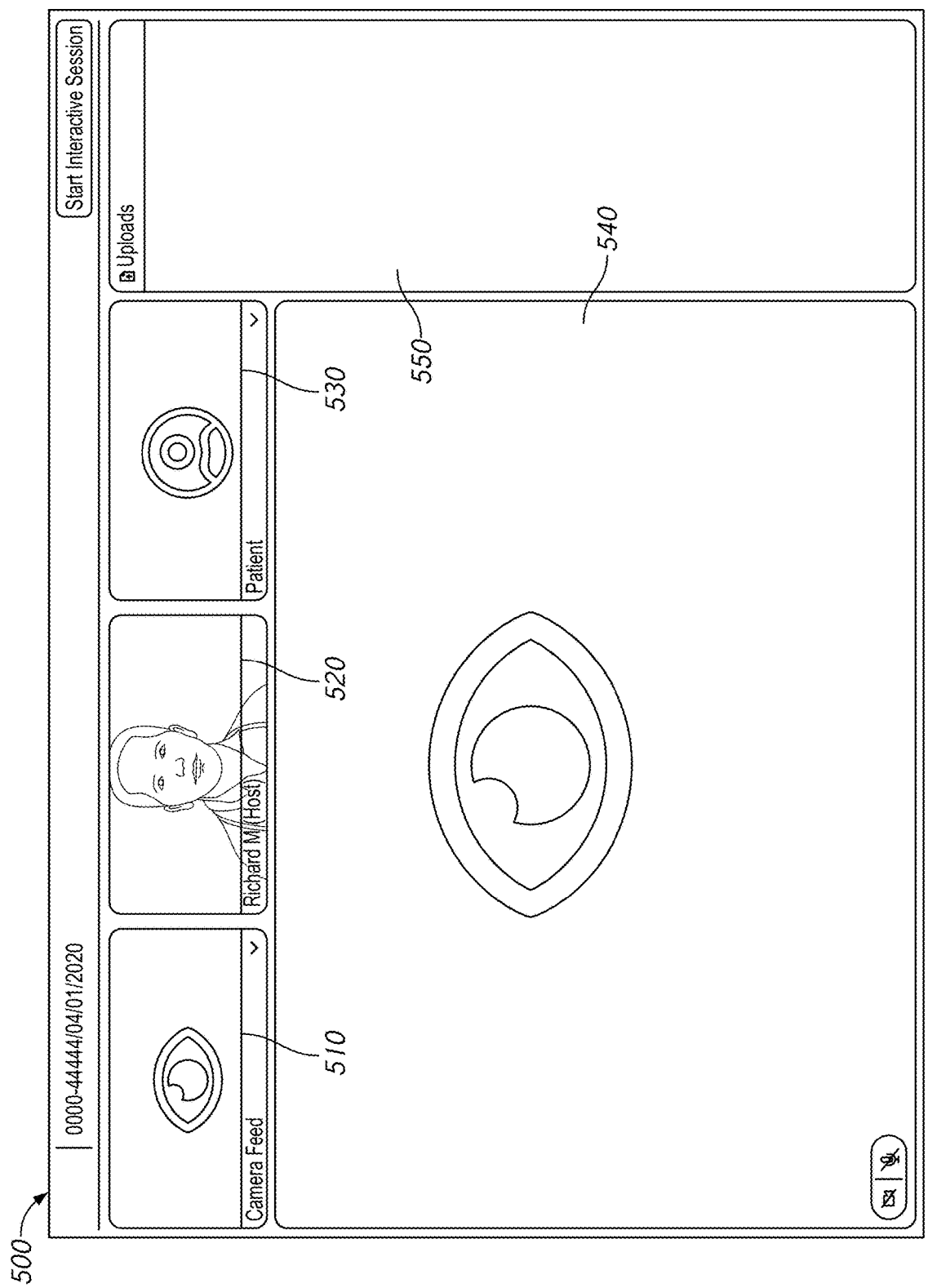
FIG. 5 is a screenshot of a user interface (UI) for an interactive ophthalmological online video session for remote participants in accordance with embodiments of the subject technology.
Figure 6:
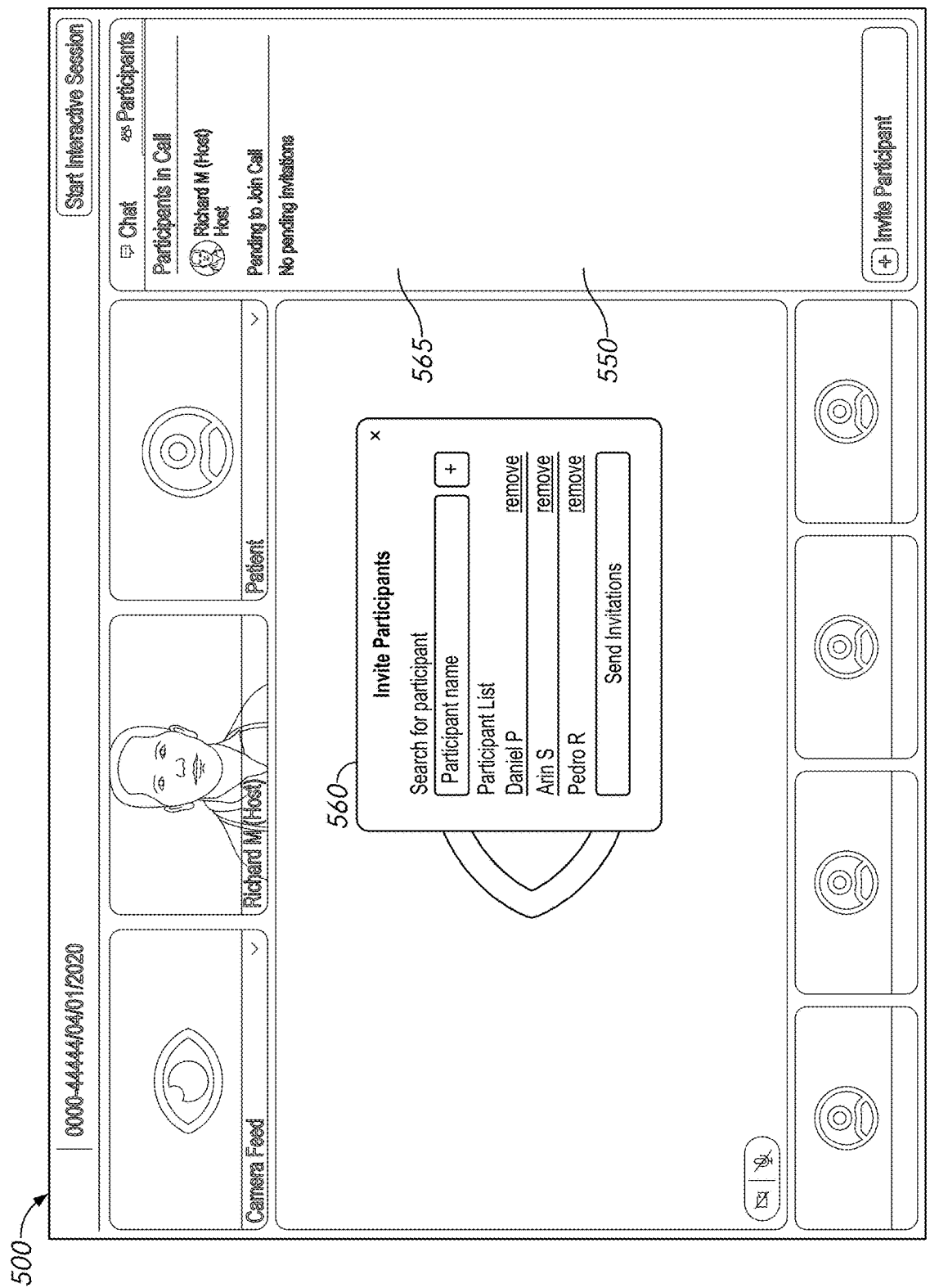
FIG. 6 is a screenshot of the UI of FIG. 5 displaying a pop-up window invitation feature in accordance with embodiments of the subject technology.
Figure 7:
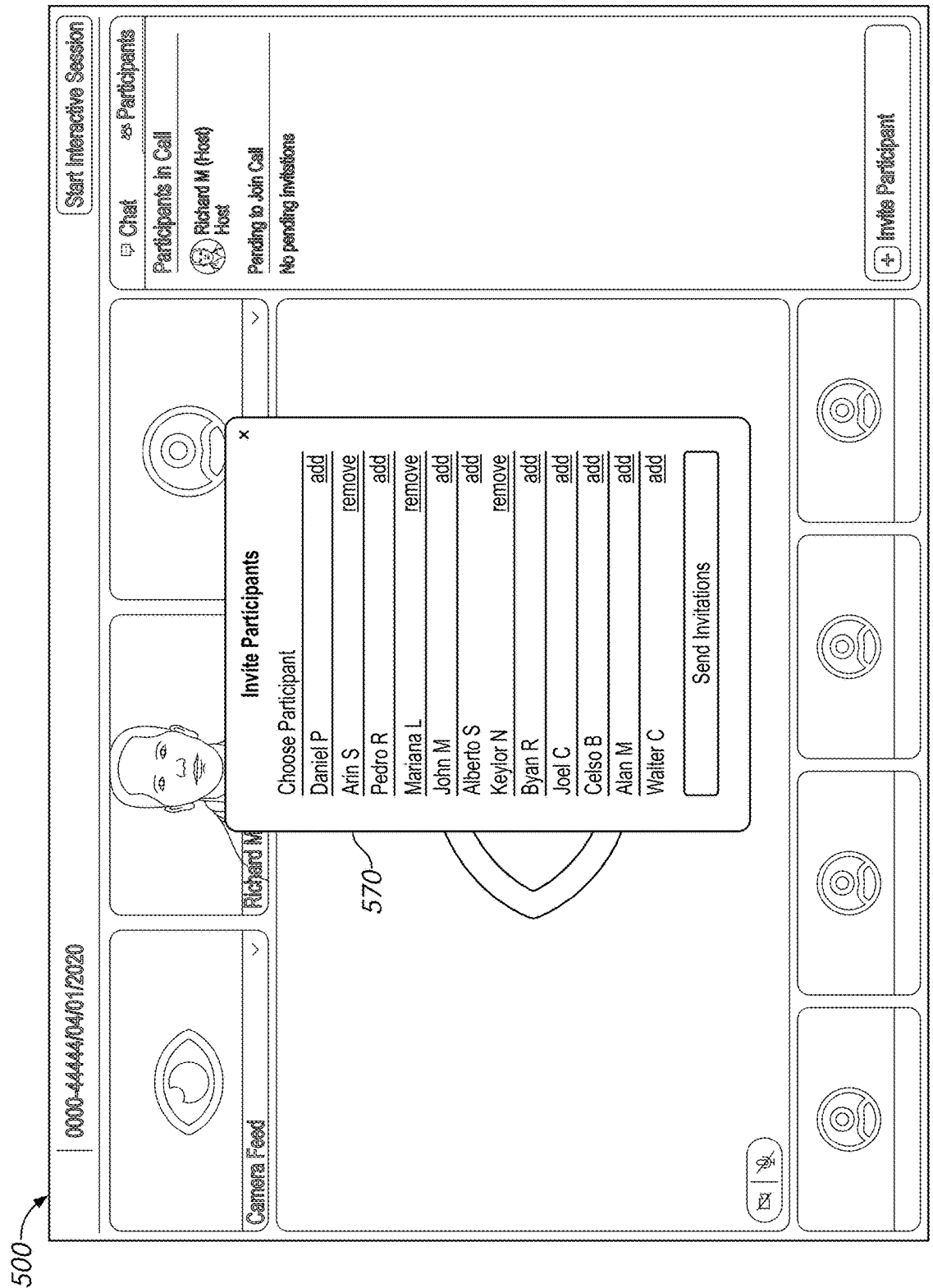
FIG. 7 is a screenshot of the UI of FIG. 5 displaying a pop-up window invitation selection menu feature in accordance with embodiments of the subject technology.
Figure 8:
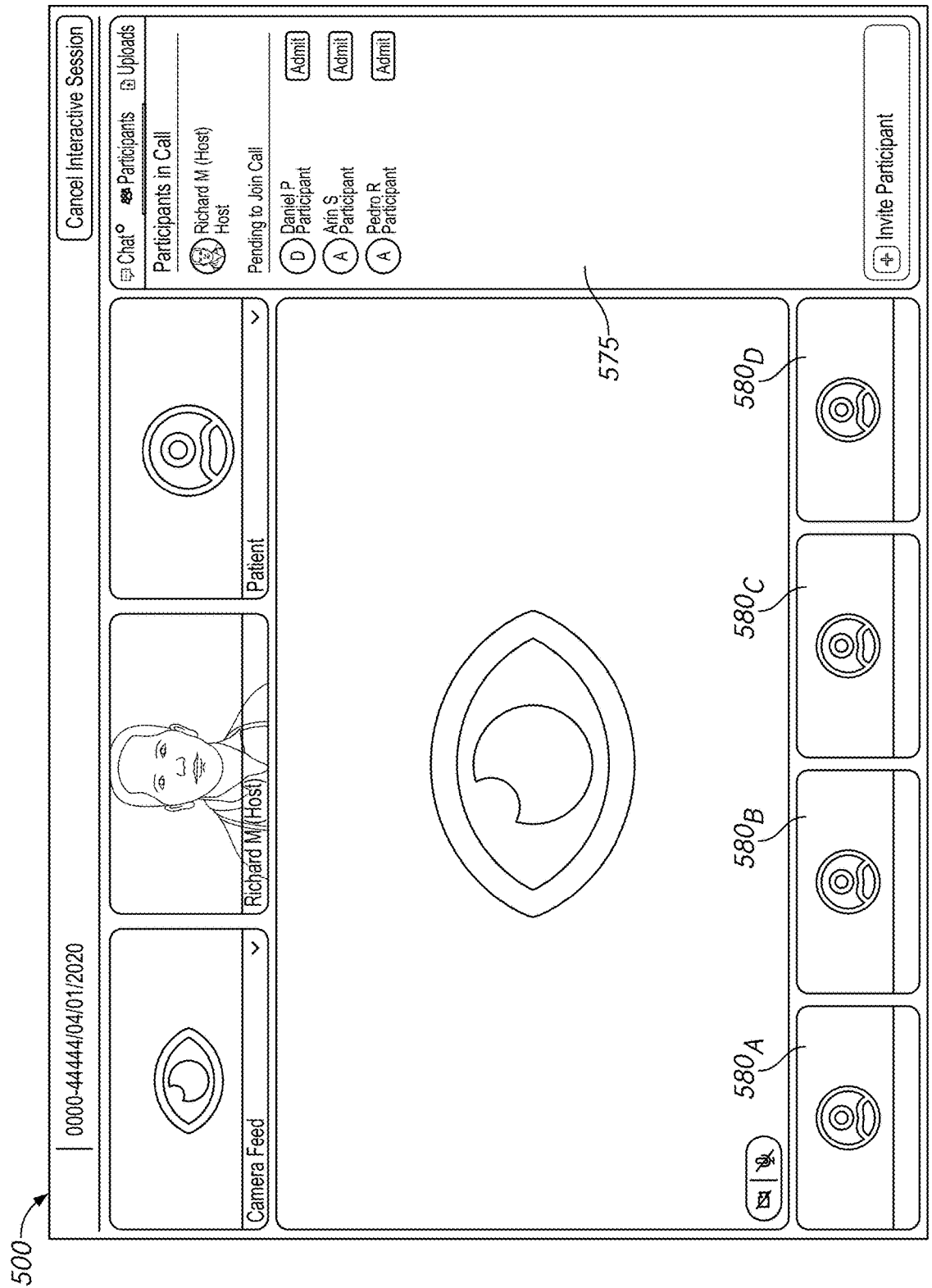
FIG. 8 is a screenshot of the UI of FIG. 5 displaying a panel of interactive participants accepting an invitation sent through the feature of FIG. 7 in accordance with embodiments of the subject technology.

FIGS. 5-16 show screenshots of a user interface (UI) 500 representing various features of a software embodiment that may be accessed via a computing device by either the physician, local ophthalmological device operator, and other third parties to view captured ophthalmological images of a patient contemporaneously taken during an examination and shown in real-time (or after the examination). In FIG. 5, the UI 500 generally includes a main panel 540 which may display different features depending on what the administrator user (generally the physician in charge of the examination) operates. Embodiments may include an auxiliary panel 550 which may be configured primarily for communication between parties engaged in an online video session. In an exemplary embodiment, the UI 500 may include a camera feed window 510, a host window 520 (which is generally displaying a photo or live picture of the physician/administrator user), and a patient window 530. The patient window 530 may show a photo of the patient during a live examination since the patient will be in front of the ophthalmological device and otherwise obscured from view. Some embodiments may include a button to initiate a live video session. FIG. 6 shows a pop-up window 560 that is configured to search a database for participants to join the video session. Temporarily referring to FIGS. 14 and 15, invitations to participants may display a status window 600 on their respective device includes a button indicating when they are ready to join and when the host is ready to conduct the video session. Participants who are pending to join or have joined the session may be displayed in the auxiliary panel 550. The displayed list of participants may be shown by selecting a participants tab 565. FIG. 7 shows a selection menu 570 that lists participants that may be added or removed from the video session.

In some embodiments, once the video session has begun, a sub-panel of windows 580 may be displayed which show the avatars, photos, or live video of attending participants. See FIG. 8. The participant list 575 may display the names of third parties joining the video session. Window 580A may show the first participant in the list, window 580B may show the second participant, window 580C may show the third participant, and window 580D may be inactive if only three invited third parties are present.

Figure 9:
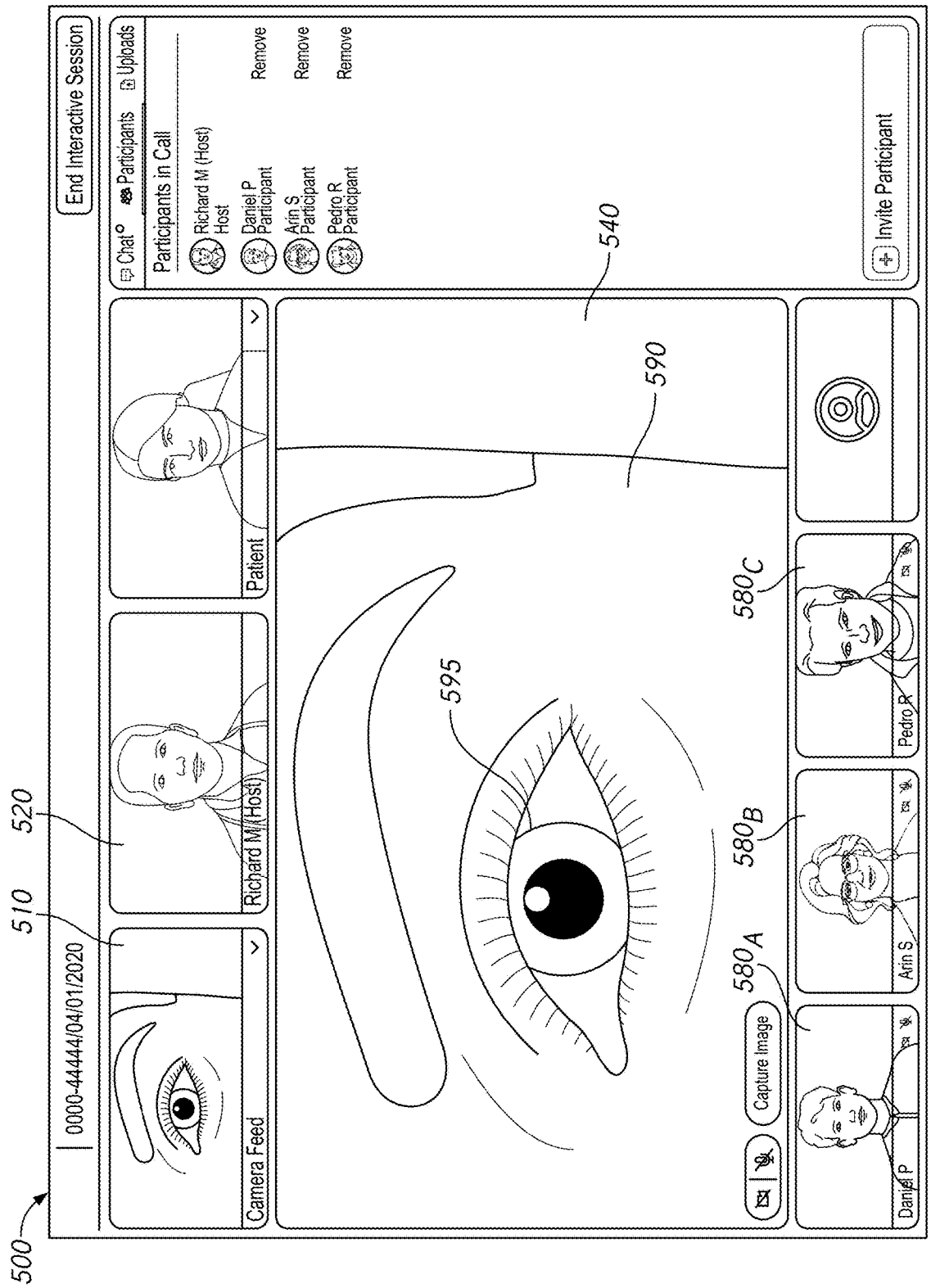
FIG. 9 is a screenshot of the UI of FIG. 5 displaying a streaming video feed of an ophthalmological image captured during a live examination in accordance with embodiments of the subject technology.
Figure 10:
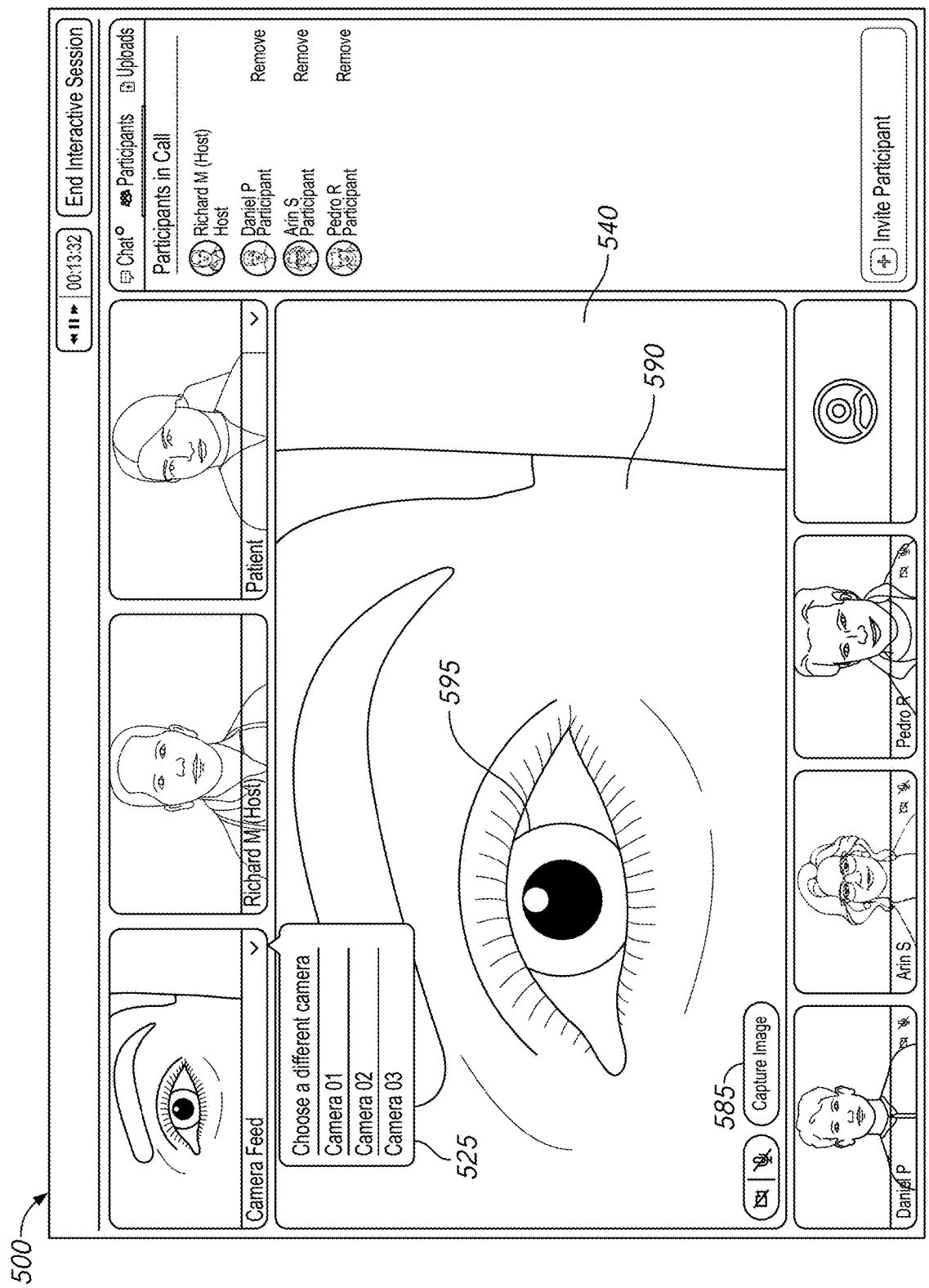
FIG. 10 is a screenshot of the UI of FIG. 9 displaying a camera selection feature in accordance with embodiments of the subject technology.

Referring now to FIGS. 9 and 10, when the ophthalmological examination system is capturing a live image 590 of the patient's eye, the user may select a view from a menu 525 in the camera feed widow 510 which may be displayed in the main panel 540 in real-time. The camera feed options available may allow the host to select a feed from the slit lamp camera, their own video camera feed, or from a camera pointing to the patient in the same room. Clicking on any of these will change the main view located in the center of the UI panel 540. The captured image may be enlarged so that the eyeball 595 and its details may be seen. Some embodiment may include a button 585 that is configured to capture a still image of the live video, which may be displayed in panel 540.

Figure 11:
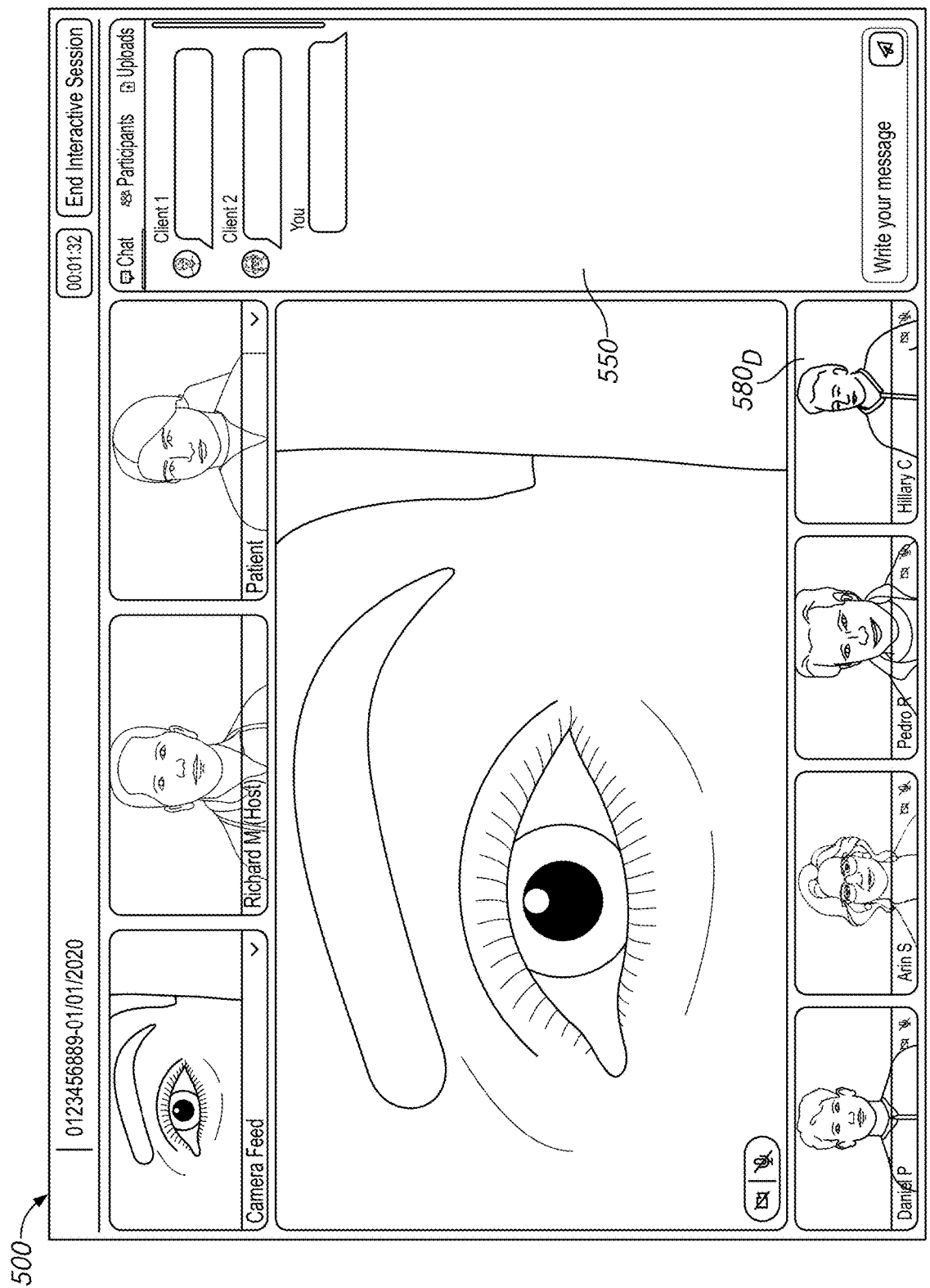
FIG. 11 is a screenshot of the UI of FIG. 9 displaying a panel for participant commentary of the captured image in accordance with embodiments of the subject technology.

Referring now to FIG. 11. some embodiments may include a chat tab that converts the panel 550 into a chat box for text entry of message by participants to comment on what is shown in the panel 540.

Figure 12:
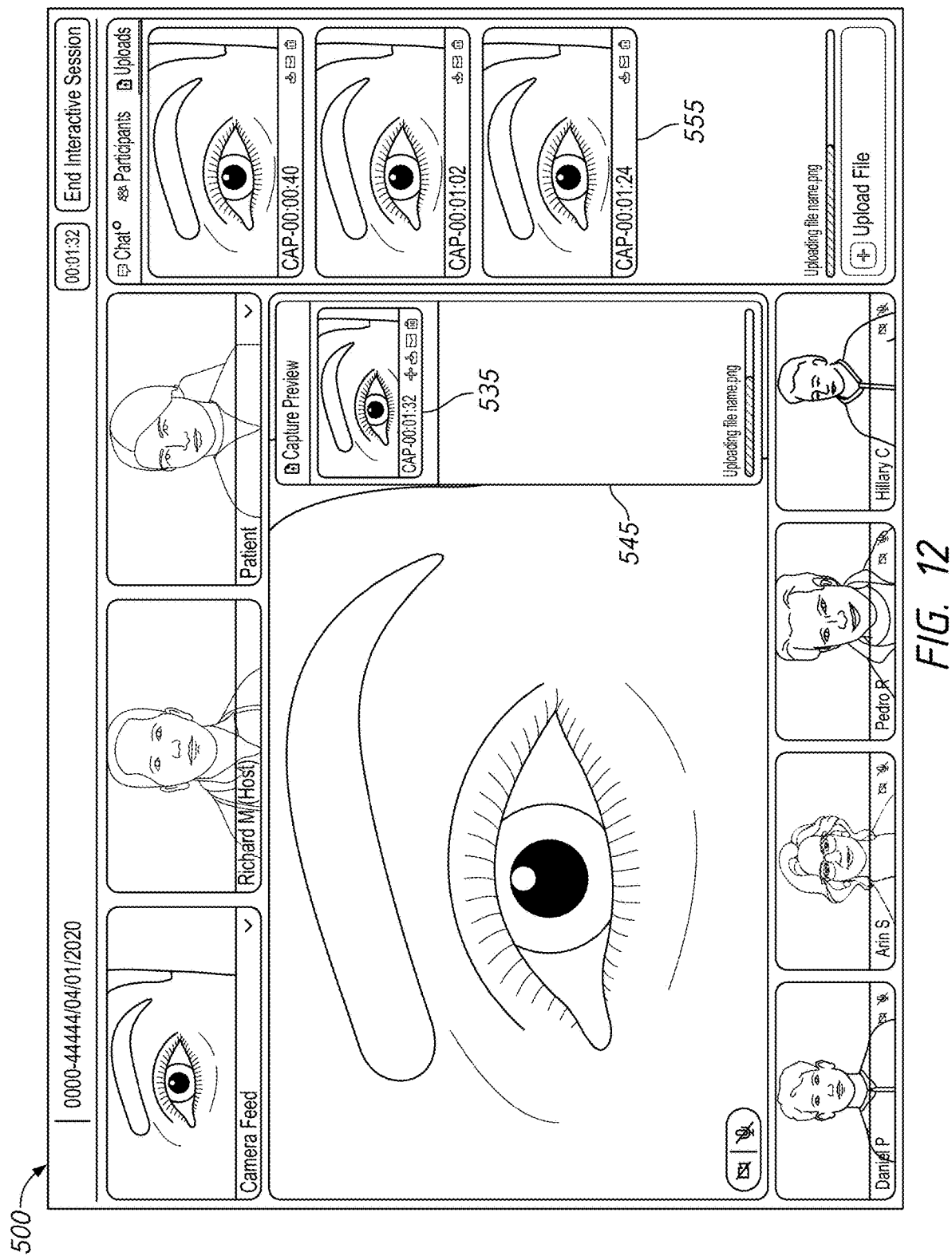
FIG. 12 is a screenshot of the UI of FIG. 9 displaying a captured image preview panel in accordance with embodiments of the subject technology.

Referring now to FIG. 12, some embodiments may include a preview pane 545 which may display still images 535 captured by the live video feed. Other embodiments may be configured to display uploaded stored images 555 in the auxiliary panel 550 by selecting an upload tab feature in the UI.

Figure 13:
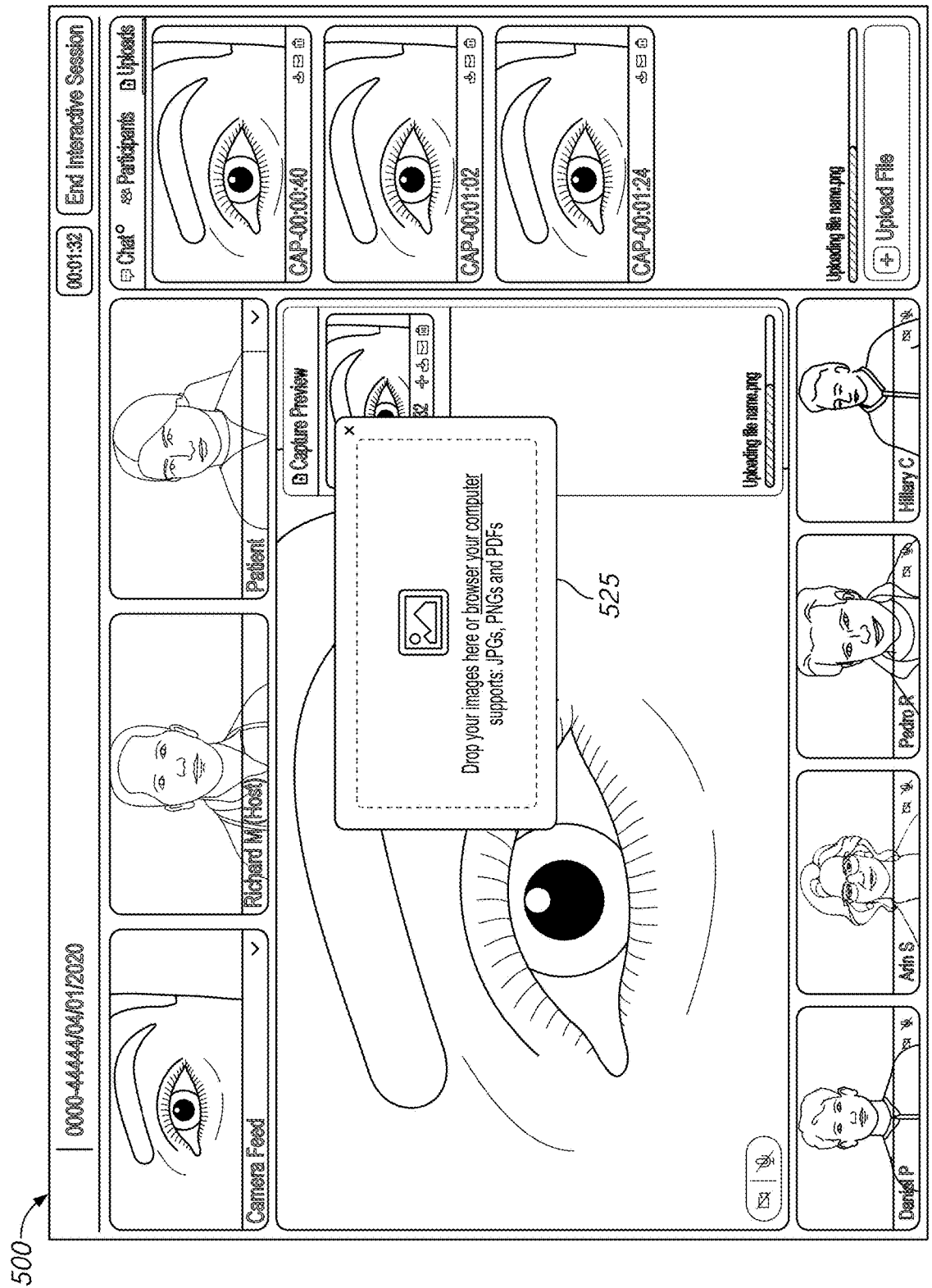
FIG. 13 is a screenshot of the UI of FIG. 12 displaying an image upload window for the captured image in accordance with embodiments of the subject technology.
Figure 14:
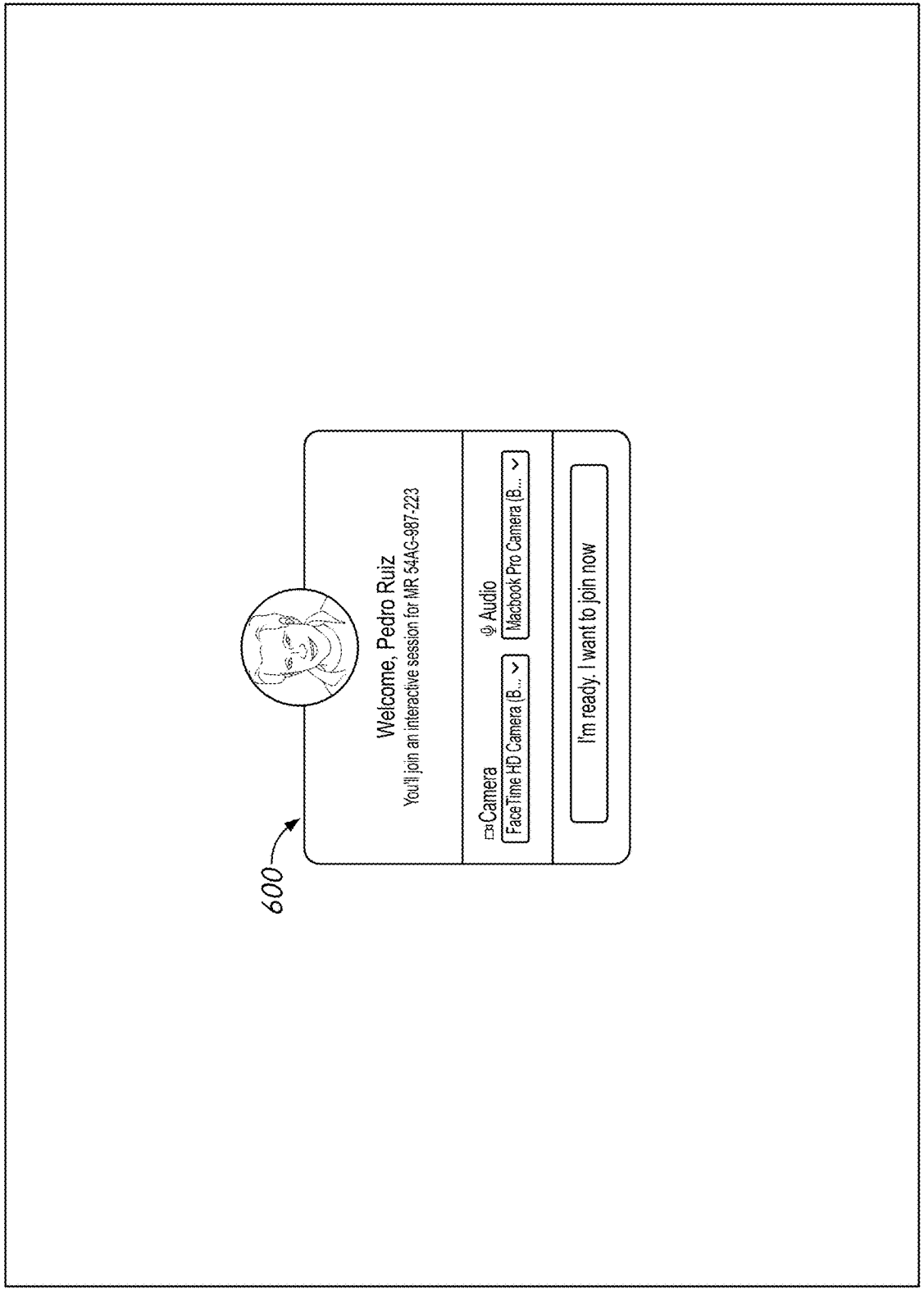
FIG. 14 is a screenshot of an online invitation UI sent to a remote participant through the system in the UI of FIG. 7 in accordance with embodiments of the subject technology.
Figure 15:
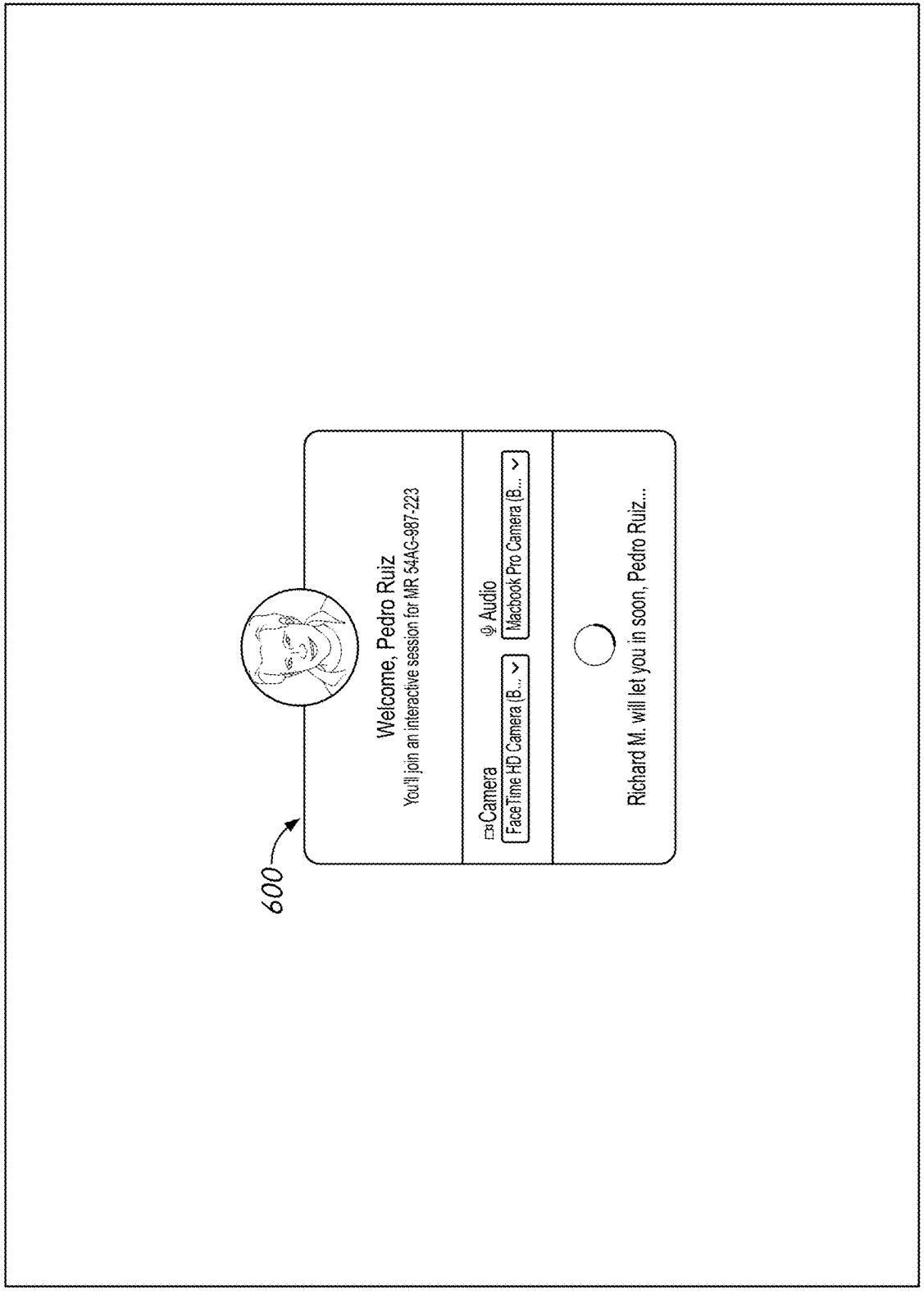
FIG. 15 is the screenshot of the UI of FIG. 14 after participant acceptance in accordance with embodiments of the subject technology.

Referring now to FIG. 13, the UI 500 may include a function to upload stored images from a computing device storage area (not shown) dropped onto an upload window 525.

Figure 16:
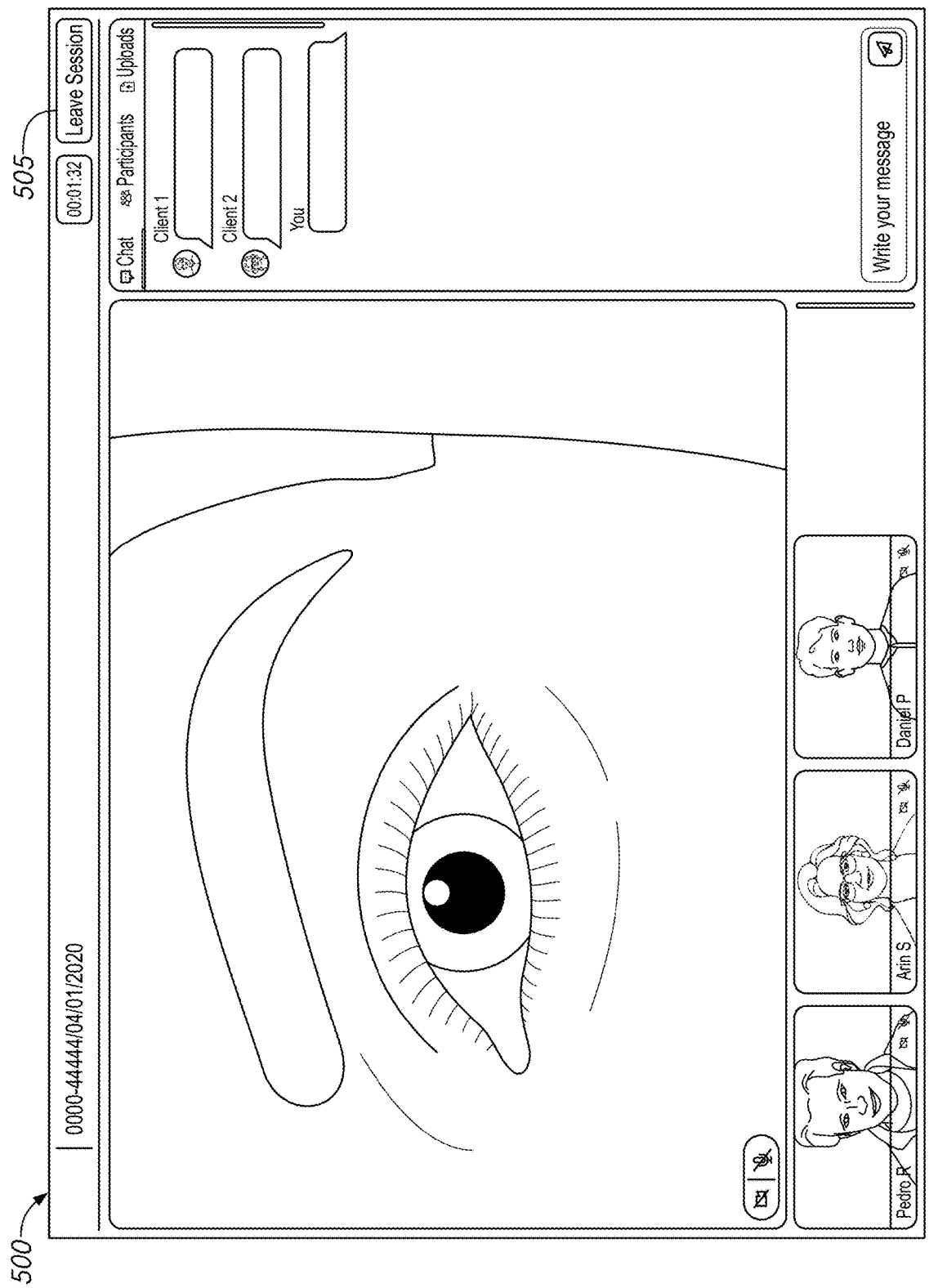
FIG. 16 is a screenshot of the UI of FIG. 9 displaying a chat panel for participant commentary of the captured image in accordance with embodiments of the subject technology.

FIG. 16 shows the UI 500 which may include a button 505 for leaving or terminating a video session.

As will be appreciated, the subject technology and accompanying software embodiments may be used with a variety of computing devices to actively participate in an ophthalmological examination. In some embodiments, the computing devices 6 and 9 (FIG. 2) may be for example, personal computer systems, tablet devices, mobile telephone devices, server computer systems, handheld or laptop devices, multiprocessor systems, microprocessor-based systems, set top boxes, programmable consumer electronics, network PCs, and distributed cloud computing environments that include any of the above systems or devices, and the like. The computing devices 6 and 9 may be described in the general context of computer system executable instructions, such as program modules, being executed by a computer system. In some embodiments, the computing devices 6 and 9 may be connected through a computer-based network and may be practiced in distributed cloud computing environments where tasks are performed by remote processing devices that are linked through a communications network. In a distributed cloud computing environment, program modules may be located in both local and remote computer system storage media including memory storage devices.

The computing devices 6 and 9 may include at least one program product having a set of program modules that are configured to carry out the functions of embodiments of the invention. The program modules generally carry out the functions and/or methodologies of embodiments of the invention as described herein.

Telepathology

Referring now to FIGS. 17-20, aspects of a system of telepathology and collaborative care are shown in accordance with different embodiments.

Figure 17:
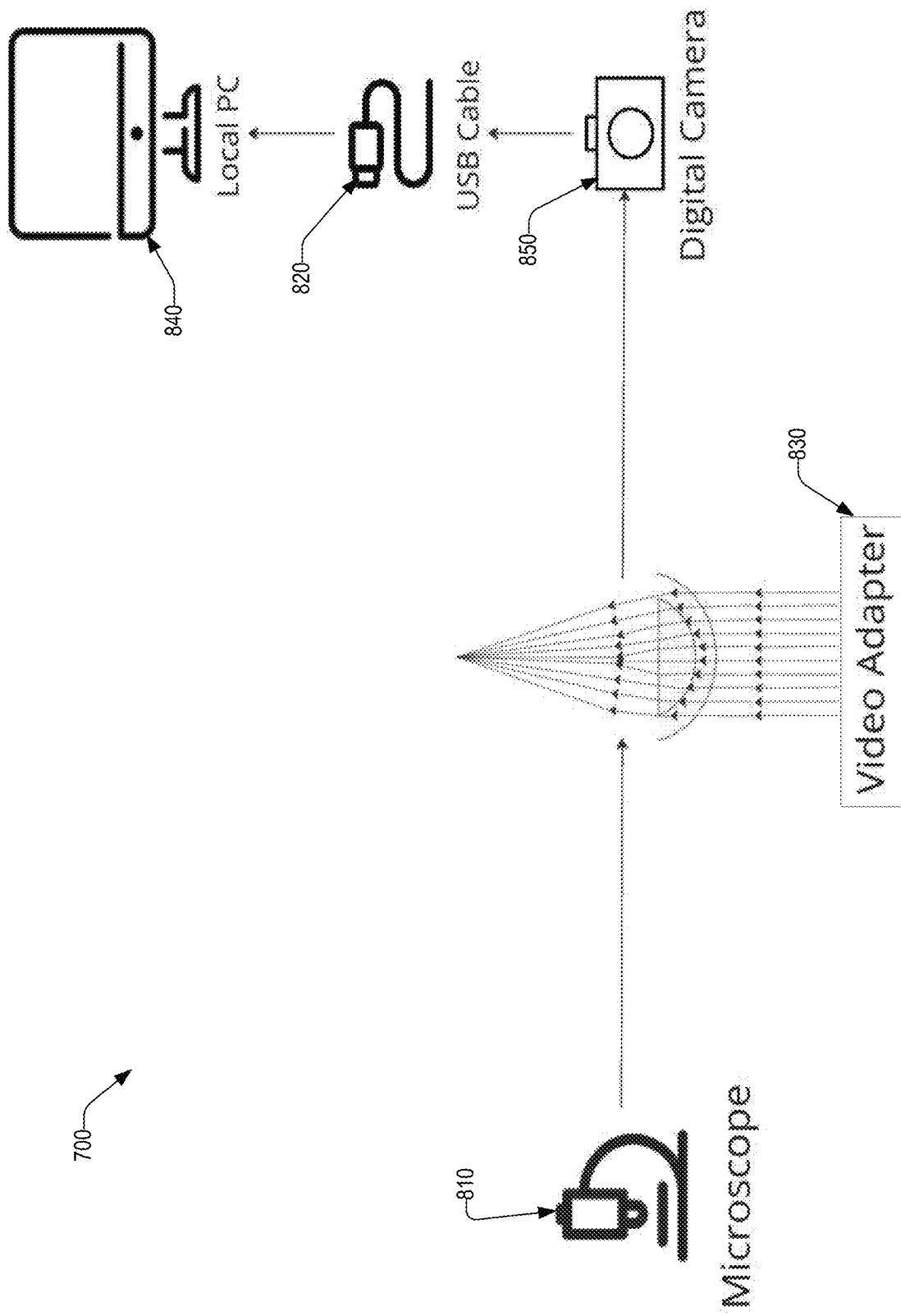
FIG. 17 is a block diagram of a local system for capturing a digital image of a pathology specimen, in accordance with an embodiment.

FIG. 17 shows a system 700 for digitally capturing a pathological specimen in a local environment. The system 700 is similar to the local elements in the system 100 except that the electronic microscope 810 is adapted for viewing specimens and does not need a slit-lamp type device to capture an image. For example, the microscope 810 may be a trinocular type. A specimen sample may be placed within the field of view and working distance of the microscope 810. A video adapter 830 may be connected to the microscope 810 that adapts the light output from the microscope 810 for capture by digital camera 850 A cable 820 (for example, a USB cable) may transfer digital video data of the image captured by the microscope 810 to a local computing device 840. The digital camera 850 may be a USV video class (UVC) camera. The digital camera 850 may record imagery seen through the microscope 810 in real-time.

Figure 18:
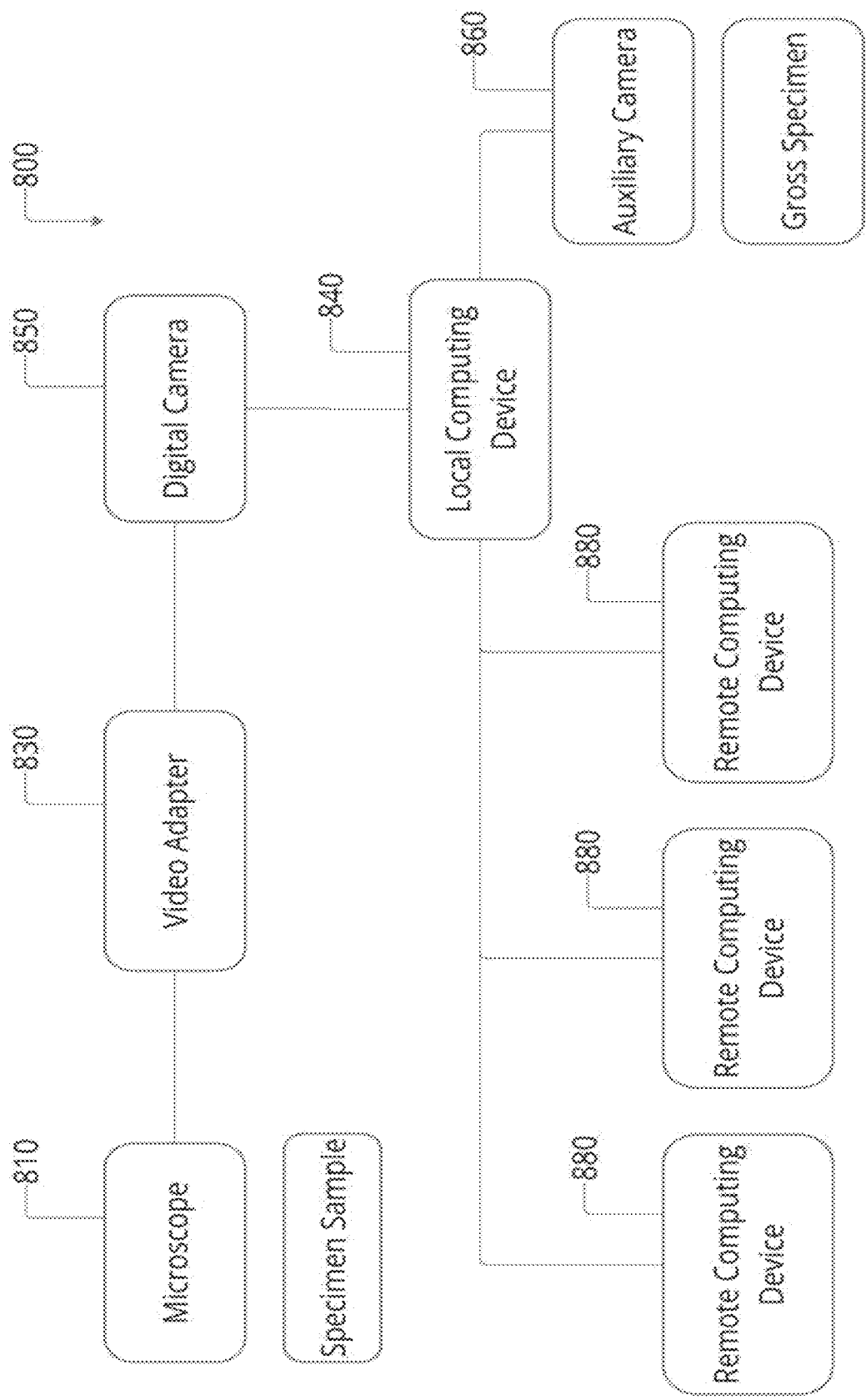
FIG. 18 is a block diagram of a system of telepathology and collaborative care, in accordance with an embodiment.

FIG. 18 shows a system 800 for collaborative telepathology. The system 800 may include all the elements in system 700 to produce a digital image of a local specimen for pathological review and analysis through a peer-to-peer connection. The system 800 includes a set-up similar to the 100 except that the elements of the system 800 are adapted for use in providing an online pathology session between local and remote users. The microscope 810 in the system 800 may be configured for use in pathology. The imagery data captured by the digital camera 850 of a local specimen mounted to the microscope 810 may be processed for retransmission through the local computing device 840 to one or more remote computing devices 880 that are connected to the local computing device 840 by network transmission. In a peer-to-peer embodiment, the local computing device 40 may be a peer host in the network connection. In the system 800, the communication between the local computing device 840 and remote computing devices 880 occurs through a web-based real-time communication protocol. The image(s) of the specimen sample may be shared collaboratively with other users from their respective computing devices 880 connected to the local computing device 840 through a live pathology session. Transmitted captured imagery is seen in real-time as if remote user(s) at the remote computing device(s) 880 were seeing the image of the specimen sample on-site in the presence of the specimen sample. In some embodiments, multiple users may be granted control privileges to control the microscope 810 and digital camera 850.

The network architecture between local computing device 840 and remote computing devices 880 may use a cloud-based configuration using the web-based real-time communication protocol that bypasses elaborate the internal Network set-ups by any participating entities. A user may log-on and initiate a live pathology session through a Cloud-based software application service. The software may be programmed to generate a hyperlink associated with the live session. The hyperlink may be sent to members that are subscribed or listed as members of a group that have pre-defined access rights to live sessions. As may be appreciated, this functionality removes a cumbersome aspect of current collaborative pathology sessions which generally require different members of a team or healthcare affiliation to be on-call and ready to physically attend a pathology session on-site. In the event collaboration is needed to obtain a second opinion or group opinion of a specimen, the system 800 gather members more quickly and conveniently by sending the link to members of the group who can now connect remotely at a moment's notice.

In operation, the remote user clicks the link through a user interface (that may be sent via an SMS message or generated within a browser as seen through the software) to connect to the Host (generally the local computing device 840). The Host may initiate a live telepathology session regardless of the PC operating software or the users' connectivity to the network connection. All users may interface with the live imaging of the specimen sample through a web browser user interface on the respective computing devices 840 or 880. As will be appreciated, the imagery provided through the web-based real-time communication protocol is clearer than what one usually sees through a host server based network. The imagery is displayed in real-time and manipulation of the microscope 810 can occur in real-time so that any of the participating parties can influence what is being observed as well as point out specific features of interest to the other parties.

In some embodiments, local and remote users may switch views within the user interface to an auxiliary camera 860 connected to the local computing device 840 that is pointed at a gross specimen from which the specimen sample was obtained from. Users, both local and remote alike, can view the gross specimen and specimen sample in real-time to make inferences and observation of tissue through the web-based real-time communication protocol feed.

As may be appreciated, the subject architecture and method of conducting a live, remote pathology session facilitates a Host's ability to collaborate the live pathology session by inviting other remote Participants without the remote participants ever logging-on to any Private Network or an App. The remote participants join the live telepathology session by clicking on hyperlinks. The set-up may use a web-based real-time communication protocol that allows for encrypted communication with very low-lag phase and excellent resolution.

The network configuration allows a Host to initiate multiple "Live Sessions" at the same time. The Host can then navigate between separate "Live Sessions", depending on the availability of the invitees in each Session. In comparison, conventional set-ups preclude a remote expert from handling multiple such requests from a plurality of Hosts. The method allows a set-up wherein the remote expert can view and manage live consultation requests from multiple remote sites at the same time. The system 800 allows the Host the ability to switch the Video feed between different cameras for example, different instances of digital camera 850 or different instances of auxiliary camera 860. In addition, several other tools are available to the Host through a software embodiment, to enhance Communication with the Expert Participant(s) including Live Chat, Screen Share, Image Capture, an Upload feature to share documents and the ability of both the Host and the Expert to record a Report while in Session.

Figure 19:
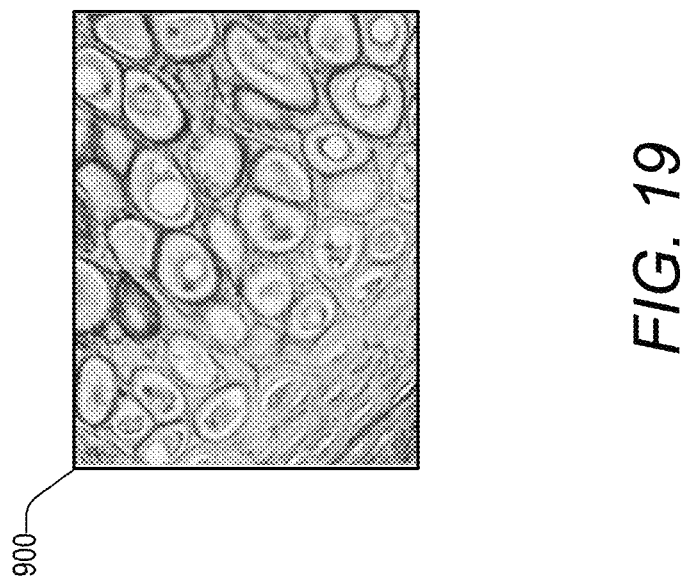
FIG. 19 is a screenshot of an example specimen shared from a microscope in a system of telepathology and collaborative care, in accordance with an embodiment.

FIG. 19 shows a screenshot 900 of a specimen captured by the system 800 and presented through a user interface of the subject technology for live, remote telepathology. The UI may be similar or the same as the one that is being used for the ophthalmology disclosure of FIGS. 1-16. Similar software may be used for both live slit-lamp tele-consultation such as those described in FIGS. 1-16 above and for tele-pathology. The remote user may use a third-party remote access software from a different PC to control the local computing device 840 that is attached to the digital microscope 810 and that houses the software that allows robotic control of the digital microscope 810.

Figure 20:
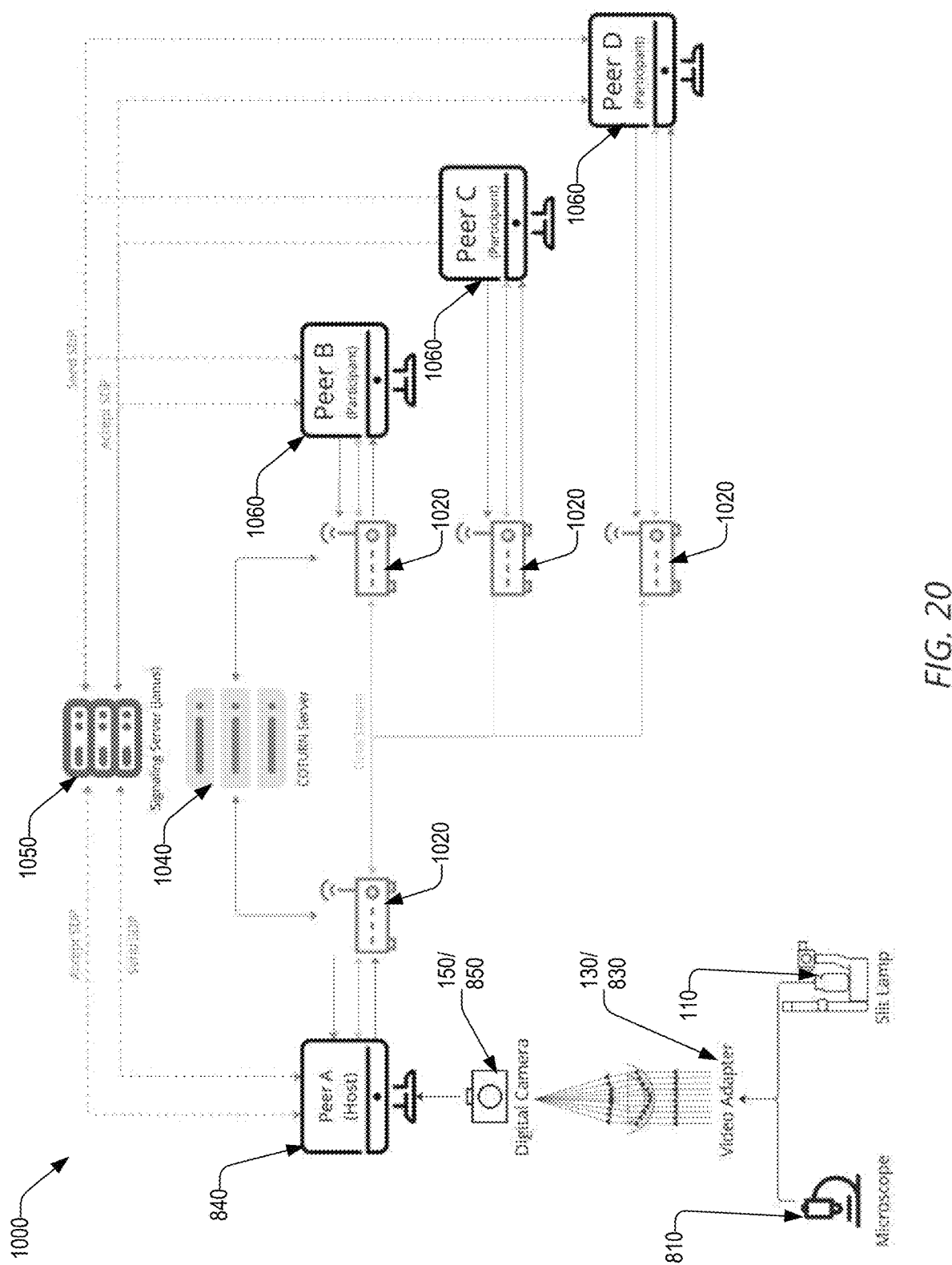
FIG. 20 is a block diagram of a web-based real-time protocol network connection for telepathology and collaborative care, in accordance with an embodiment.

FIG. 20 shows a peer-to-peer network architecture 1000 for a collaborative online tele-ophthalmological or tele-pathological session using a Web Real-Time Communications (WebRTC) protocol. The architecture 1000 may include the tele-ophthalmological or tele-pathological elements of systems 100 and 700 as needed for a session. Image capture of the subject within the field of view of the slit-lamp 110 or microscope 710 remains the same in architecture 1000 and is not repeated. Once the captured image data is obtained by the local computing device 840, in a WebRTC connection, the local computing device 840 sends a session description protocol (SDP) containing certain identifying information (otherwise known as internet connectivity establishment or ICE candidates), such as port and IP information, to a signaling server 1050. The signaling server 1050 sends the SDP along to the remote peer computing devices 1060 (which may be analogous to the remote computing devices 880 shown in FIG. 18). The signaling server 1050 also relays SDP acceptance signals between the peers 840 and 1060s. Some embodiments include Network Address Translation (NAT) devices 1020. The NAT devices 1020 may block client devices from locating their own internet protocol (IP) addresses. In some embodiments, the architecture 1000 may use a Traversal Using Relays around NAT (TURN) process. ICE candidates and SDP protocol connections may be avoided to go around the NAT firewall. TURN servers 1040 may have public IP addresses, making them easy to connect to. When two clients connect (for example, peer host computing device 840 and one of the remote computing devices 1060), they can send media to one another using the TURN server 1040 as an intermediary. As such, the media data obtained at the scope level may be viewed in real-time and smoothly by remote computing devices 1060 for clear review and analysis of the features obtained within an image.

Aspects of the disclosed invention may be embodied as a system, method or process, or computer program product (sometimes called a software application). Accordingly, aspects of the disclosed invention may take the form of an entirely hardware embodiment, an entirely software embodiment (including firmware, resident software, micro-code, etc.) or an embodiment combining software and hardware aspects "system." Furthermore, aspects of the disclosed invention may take the form of a computer program product embodied in one or more computer readable media having computer readable program code embodied thereon.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above. While some details of the accompanying figures are not described above, their use and configuration are understood by those of ordinary skill in the art and are part of the disclosure herein.

What is claimed is:

1. A method of performing a tele-pathological collaborative online session, comprising:
   capturing light reflected off a specimen sample within the field of view of a microscope, wherein the microscope is coupled to a video adapter configured to focus a light output from the microscope;
   capturing the reflected light with a digital camera;
   converting the reflected light captured by the digital camera into a digital format of data;
   transmitting the digitally formatted data through a network using a web-based real-time communication protocol to a remote computing device located in a second location;
   hosting a live video session on the remote computing device;
   inviting at least one third party participant to join the live video session from another computing device that is remote from the remote computing device;
   displaying an image of the specimen sample in real-time video on the remote computing device;
   displaying the real-time video of the image of the specimen sample to the invited third party participant through the live video session;
   providing a still image capture function, wherein a still image of the real-time video is captured during the live video session;
   providing an upload function wherein the captured still image is displayed to all the members of the live video session; and
   displaying the image alongside a face-to-face audio-visual communication.

2. The method of claim 1, further comprising displaying the image of the specimen on a local computing device coupled to the microscope, wherein the display of the specimen on the local computing device and on the remote computing device occurs simultaneously.

3. The method of claim 1, further comprising providing a chat panel, wherein a host of the live video session and the third party participant may communicate by chatting in the chat panel.

4. The method of claim 1, wherein the microscope is interfaced with a web-based software platform configured to allow an observer to view the microscope imagery being conducted at a remote location in real-time seamlessly and alongside "face-to-face" audio-visual communication.

5. The method of claim 1, further comprising providing a camera feed function wherein a camera feed view is switchable between a perspective of either the microscope or an auxiliary camera pointed at a gross specimen.

6. A computer program product for hosting a tele-pathological collaborative online session comprising a non-transitory computer readable storage medium having computer readable program code embodied therewith, the computer readable program code being configured to, when executed by a processor:
   capture light reflected off a specimen sample within the field of view of a microscope, wherein the microscope is coupled to a video adapter configured to focus a light output from the microscope;
   capture the reflected light with a digital camera;
   convert the reflected light captured by the digital camera into a digital format of data;
   transmit the digitally formatted data through a network using a web-based real-time communication protocol to a remote computing device located in a second location;
   host a live video session on the remote computing device;
   invite at least one third party participant to join the live video session from another computing device that is remote from the remote computing device;
   display an image of the specimen sample in real-time video on the remote computing device;
   display the real-time video of the image of the specimen sample to the invited third party participant through the live video session;
   provide a still image capture function, wherein a still image of the real-time video is captured during the live video session;
   provide an upload function wherein the captured still image is displayed to all the members of the live video session; and
   display the image alongside a face-to-face audio-visual communication.

7. The computer program product of claim 6, wherein the computer readable program code is further configured to display the image of the specimen on a local computing device coupled to the microscope, wherein the display of the specimen on the local computing device and on the remote computing device occurs simultaneously.

8. The computer program product of claim 6, wherein the computer readable program code is further configured to provide a chat panel, wherein a host of the live video session and the third party participant may communicate by chatting in the chat panel.

9. The computer program product of claim 6, wherein the microscope is interfaced with a web-based software platform configured to allow an observer to view the microscope imagery being conducted at a remote location in real-time seamlessly and alongside "face-to-face" audio-visual communication.

10. The computer program product of claim 6, wherein the computer readable program code is further configured to provide a camera feed function wherein a camera feed view is switchable between a perspective of either the microscope or an auxiliary camera pointed at a gross specimen.

\* \* \* \* \*